(12) United States Patent
Yang et al.

(10) Patent No.: US 12,719,332 B2
(45) Date of Patent: Aug. 25, 2026

(54) BACK-YOKELESS MAGNETIC-BEARING-INTEGRATED MOTOR

(71) Applicant: GACHON UNIVERSITY OF INDUSTRY-ACADEMIC COOPERATION FOUNDATION, Seongnam-si (KR)

(72) Inventors: In-Jun Yang, Seoul (KR); Seong Hyeon Go, Geoje-si (KR); Won-Ho Kim, Hwaseong-si (KR); Kwang-Soo Kim, Wonju-si (KR); Dong-Hoon Jung, Wonju-si (KR); Seung-Hyeon Lee, Seoul (KR)

(73) Assignee: GACHON UNIVERSITY OF INDUSTRY-ACADEMIC COOPERATION FOUNDATION, Seongnam-si (KR)

( * ) Notice: Subject to any disclaimer, the term of this patent is extended or adjusted under 35 U.S.C. 154(b) by 394 days.

(21) Appl. No.: 18/281,697

(22) PCT Filed: Dec. 13, 2021

(86) PCT No.: PCT/KR2021/018886

§ 371 (c)(1),
(2) Date: Sep. 12, 2023

(87) PCT Pub. No.: WO2022/196895

PCT Pub. Date: Sep. 22, 2022

(65) Prior Publication Data

US 2024/0313613 A1 Sep. 19, 2024

(30) Foreign Application Priority Data

Mar. 16, 2021 (KR) ........................ 10-2021-0033804

(51) Int. Cl.
*H02K 7/09* (2006.01)
*F16C 32/04* (2006.01)

(52) U.S. Cl.
CPC ........... *H02K 7/09* (2013.01); *F16C 32/0474* (2013.01); *F16C 2380/26* (2013.01)

(58) Field of Classification Search
CPC .. H02K 7/09; H02K 1/12; H02K 1/27; H02K 7/00; H02K 21/12; H02K 1/2783;
(Continued)

(56) References Cited

U.S. PATENT DOCUMENTS 6,141,856 A 11/2000 Johnson
2010/0176674 A1* 7/2010 Post ..................... H02K 49/102 310/103
(Continued)

FOREIGN PATENT DOCUMENTS

JP 2002-084695 A 3/2002
JP 2004-350427 A 12/2004
(Continued)

OTHER PUBLICATIONS

International Search Report mailed Mar. 21, 2022 for PCT International Application No. PCT/KR2021/018886 (pp. 6).

*Primary Examiner* — Ahmed Elnakib
(74) *Attorney, Agent, or Firm* — Nixon Peabody LLP

(57) ABSTRACT

The following disclosure relates to a back yokeless magnetic bearing-integrated motor, and in particular, to a back yokeless magnetic bearing-integrated motor in which a back yoke is eliminated in a permanent magnet motor and a magnetic bearing is installed inside a rotor, thereby integrating the magnetic bearing with a motor.

14 Claims, 17 Drawing Sheets

(58) Field of Classification Search
CPC .......................... H02K 7/003; H02K 2213/03; F16C 32/0474; F16C 2380/26; F16C 32/04
USPC ......................................................... 310/90.5
See application file for complete search history.

(56) References Cited

U.S. PATENT DOCUMENTS

2015/0275966 A1 * 10/2015 Tremelling ........... F16C 32/047
310/90.5
2015/0280523 A1 * 10/2015 Tremelling .............. H02K 7/09
29/598
2022/0247266 A1 * 8/2022 Oniduka ................... F04D 1/00

FOREIGN PATENT DOCUMENTS

JP 2010-130871 A 6/2010
JP 2010130871 * 6/2010
JP 2016-178801 A 10/2016
JP 2016178801 * 10/2016
KR 100224533 B1 11/1999
KR 20120056623 A 6/2012
WO WO-2020183884 A1 * 9/2020 ............... H02K 7/14

* cited by examiner

FIG. 1 (a) (Prior Art)
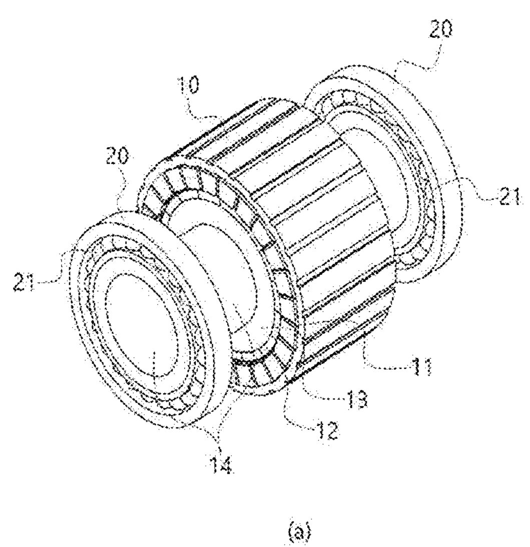
(a)
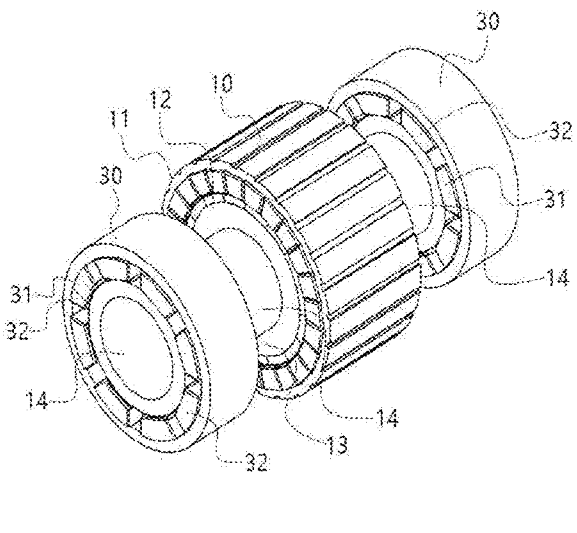
(b)
FIG. 1 (b) (Prior Art)

[FIG. 2]
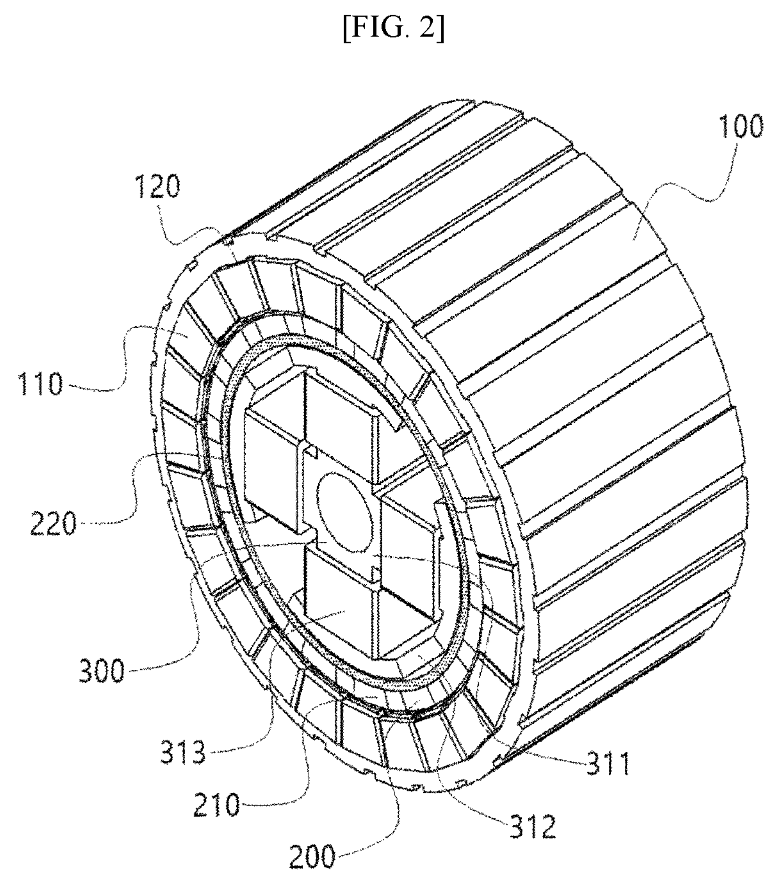

[FIG. 3]
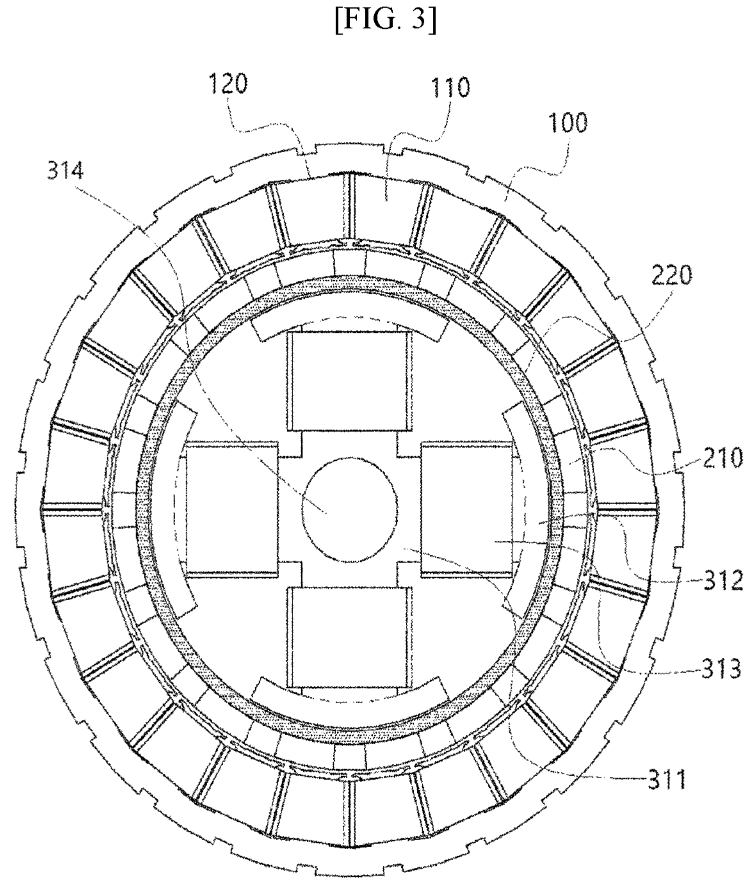

[FIG. 4]

[FIG. 5]
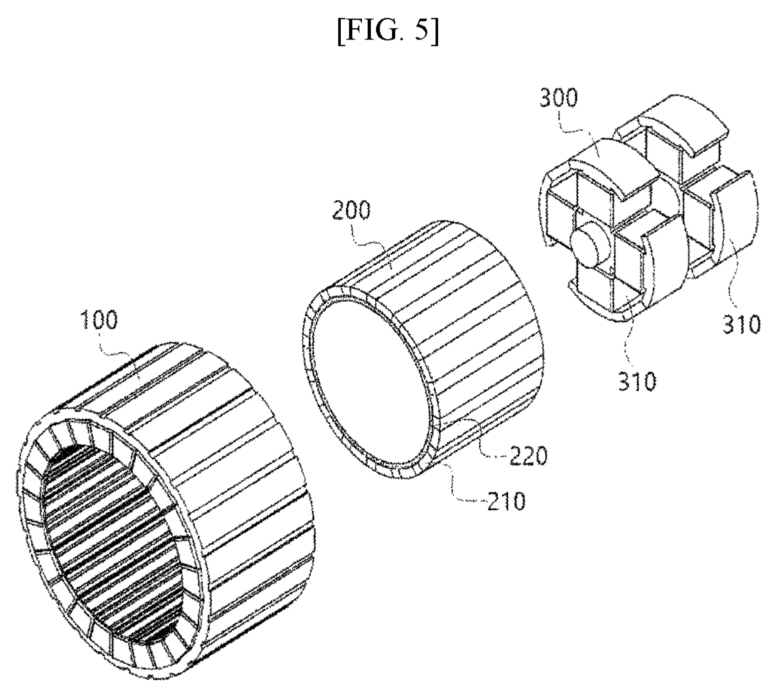

[FIG. 6]
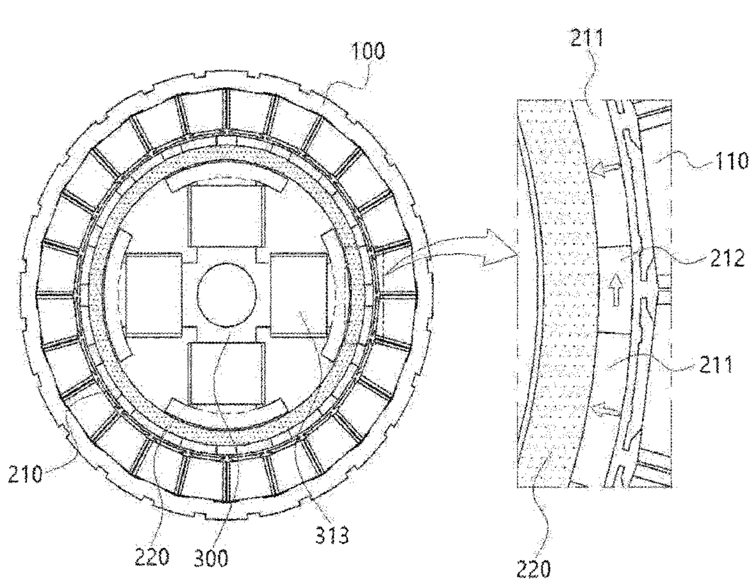
[FIG. 7]
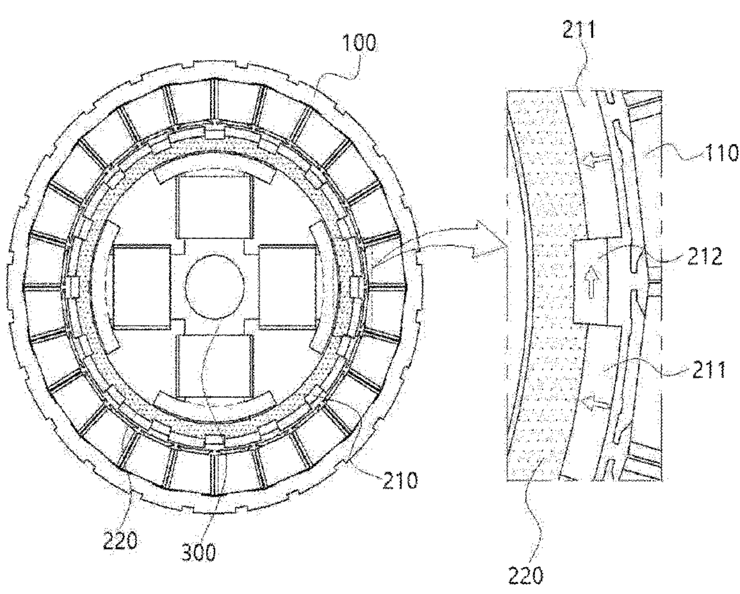

[FIG. 8]
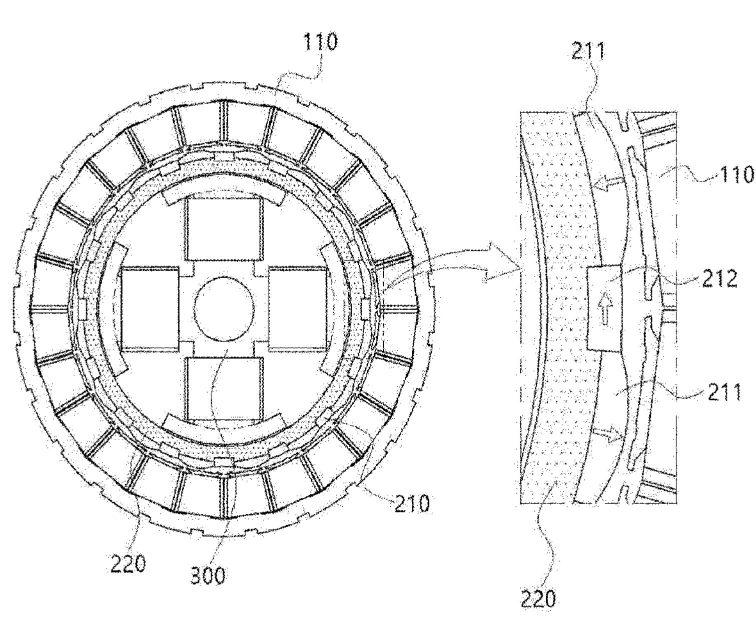
[FIG. 9]
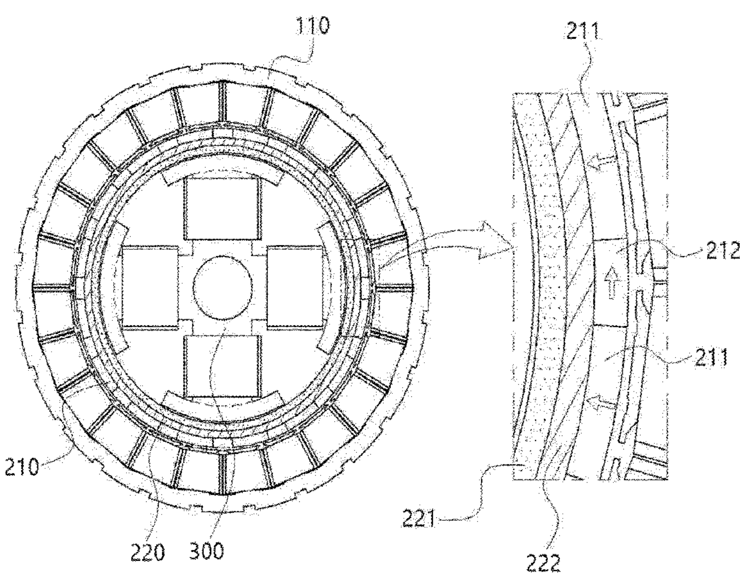

[FIG. 10]
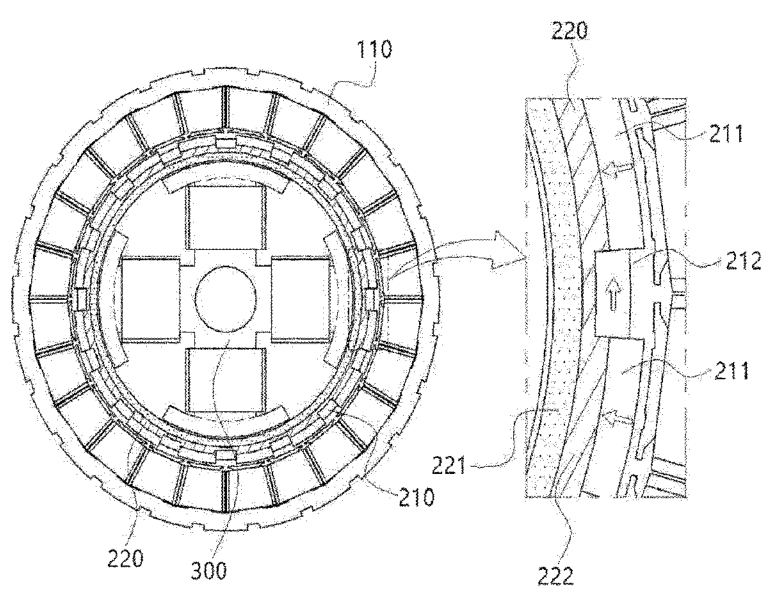
[FIG. 11]
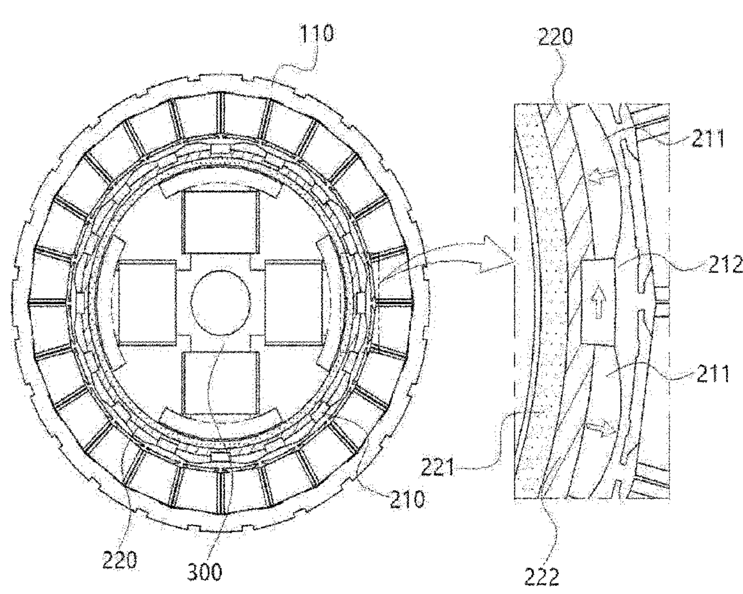

[FIG. 12]
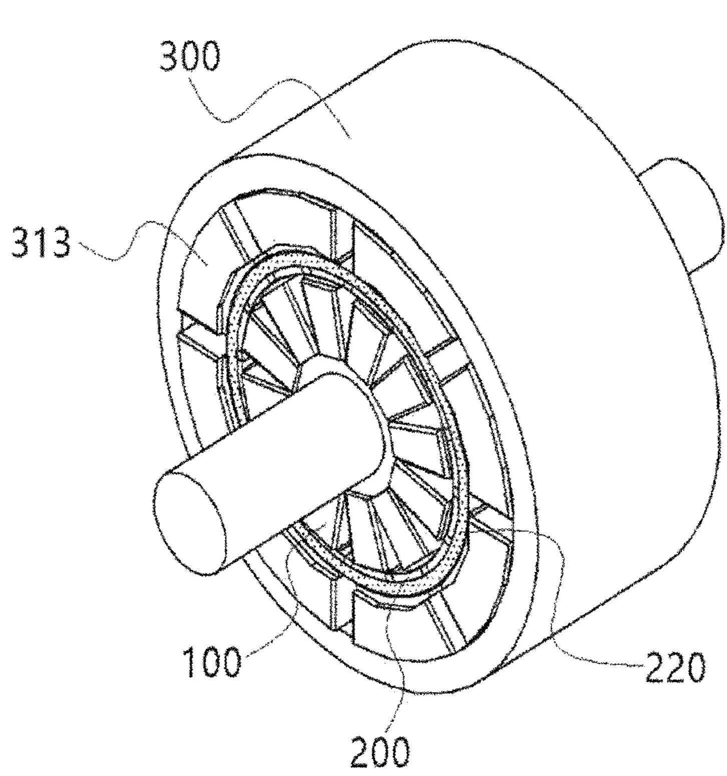

[FIG. 13]
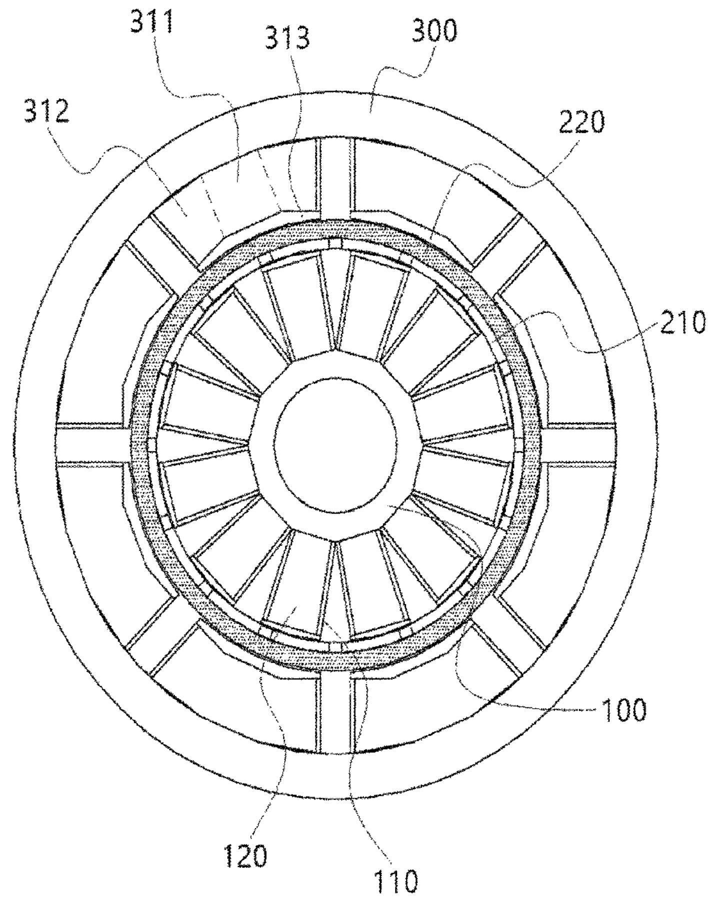
[FIG. 14]
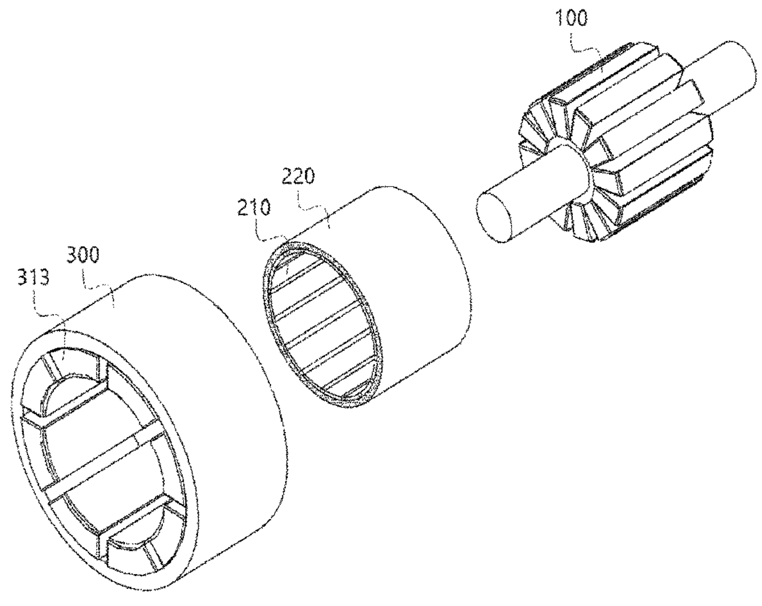

[FIG. 15a]

| ITEM | | ANALYSIS MODEL | UNIT |
|---|---|---|---|
| BASIC SPECIFICATION | POLE/SLOT | 16 / 24 | - |
| | CONSTANT | 3 | - |
| | LENGTH OF AIR GAP | 0.9 | mm |
| OPERATING CONDITION | CAPACITY (MAXIMUM CURRENT IS APPLIED) | 50 | kW |
| | SPEED | 1,770 | rpm |
| | MAXIMUM CURRENT | 240 | $A_{rms}$ |
| | VOLTAGE | 270 (WHEN CONTROL MARGIN IS CONSIDERED: 250) | $V_{peak}$ |
| STATOR | OUTER DIAMETER/ INNER DIAMETER/ LAMINATION | 280 / 201.8 / 50 | mm |
| | MATERIAL | 35PN230 | - |
| ROTOR | OUTER DIAMETER/ INNER DIAMETER/ LAMINATION | 200 / 174.66 / 50 | mm |
| | MATERIAL | 35PN230 | - |
| SHAFT | MATERIAL | S45C | - |
| WINDING | NUMBER OF TURNS | 59 | - |
| | NUMBER OF PARALLEL CIRCUITS | 8 | - |
| | LINE DIAMETER (BASED ON BARE COPPER WIRE) | 1.3 | mm |
| | MATERIAL | COPPER | - |
| | PHASE RESISTANCE (20 °C) | 0.016 | Ω |
| | CONNECTION METHOD | Y | - |
| PERMANENT MAGNET | THICKNESS | 4.67 | mm |
| | LENGTH | - | mm |
| | MATERIAL | N42UH | - |
| | RESIDUAL MAGNETIC FLUX DENSITY (20 °C) | 1.31 | T |
| | COERCIVE FORCE (20 °C) | -1042.46 | kA/m |

[FIG. 15b]
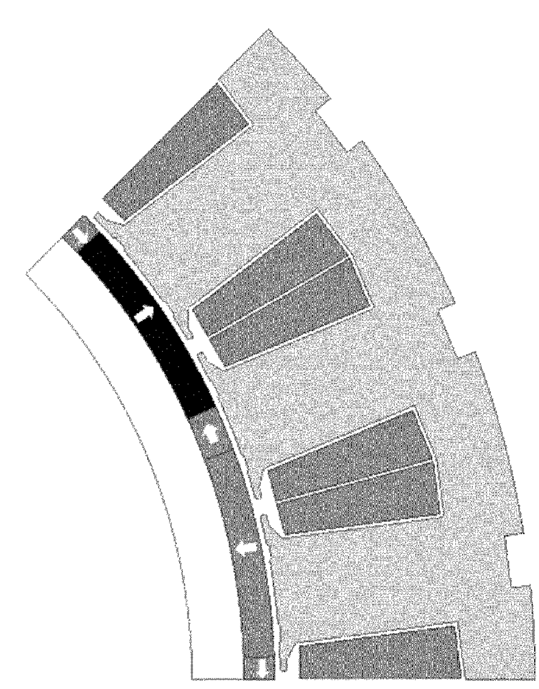
[FIG. 15c]
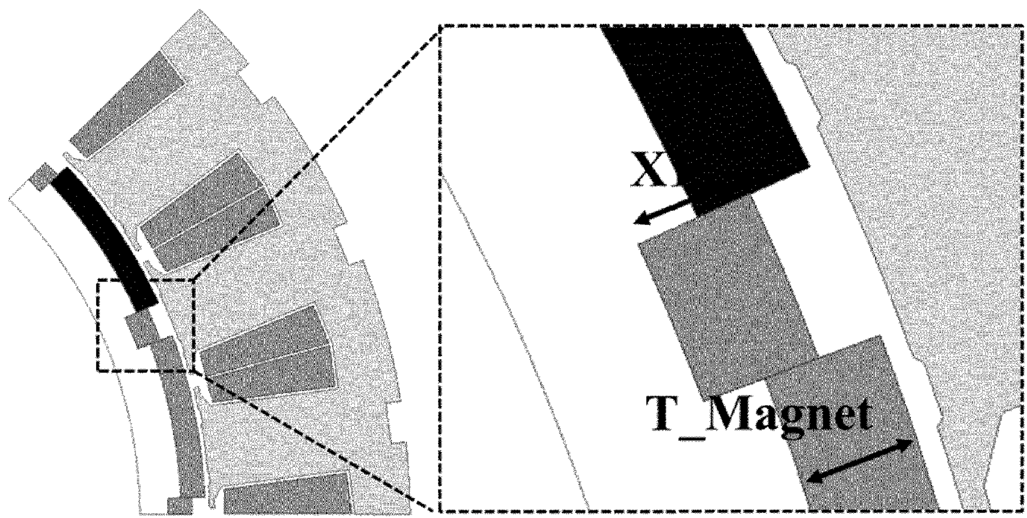

[FIG. 15d]
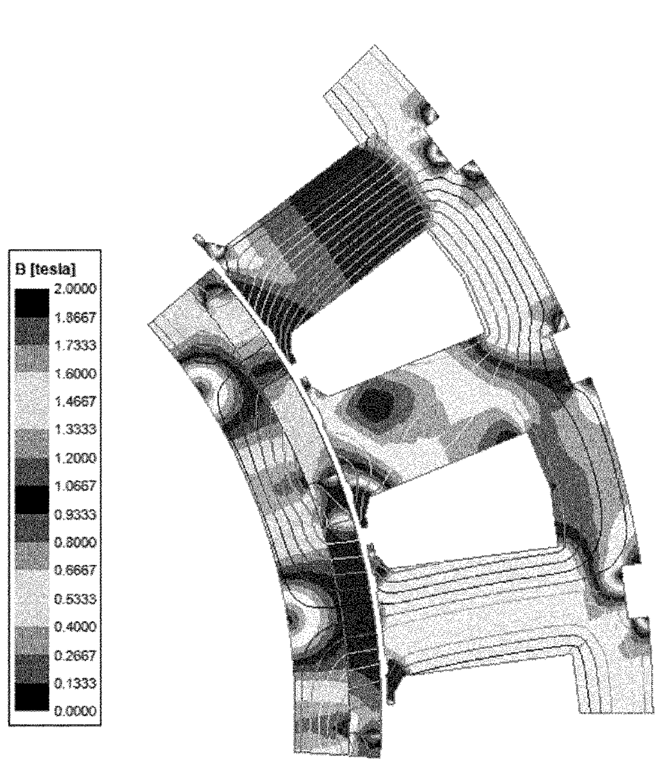
Model1 B-Plot

[FIG. 15e]
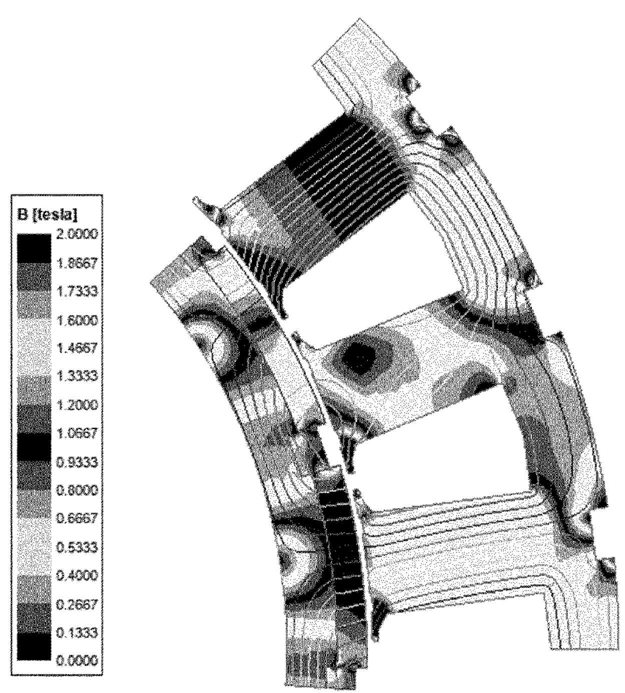
B-Plot (X1/T_Magnet = 36%)
[FIG. 16a]
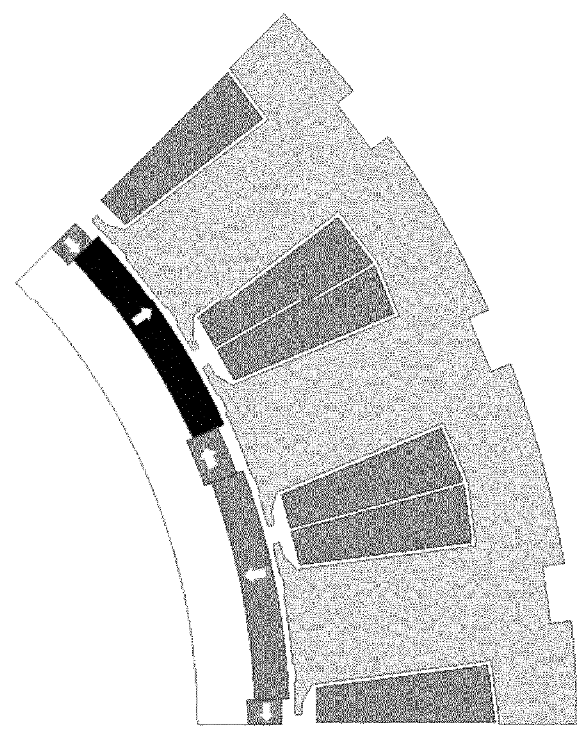

[FIG. 16b]
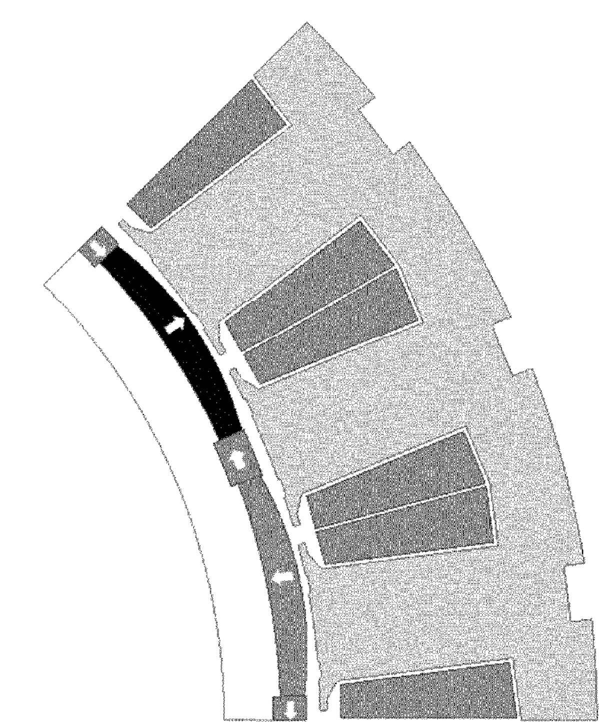
[FIG. 16c]
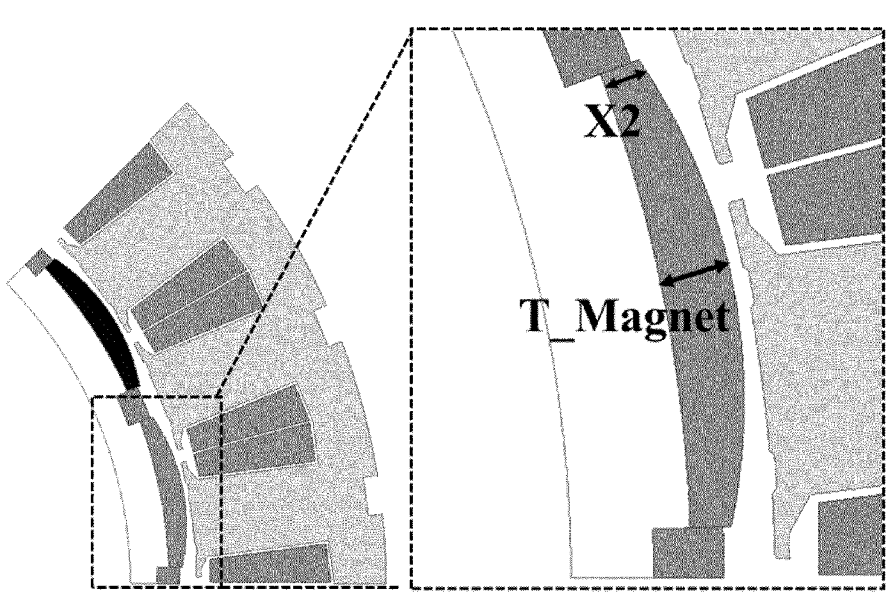

[FIG. 16d]
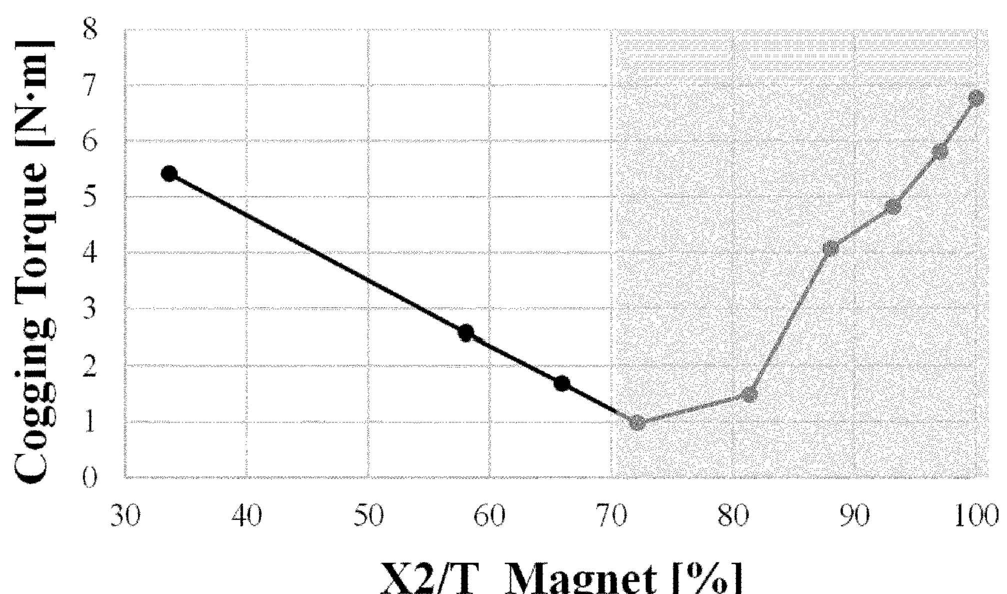
[FIG. 16e]
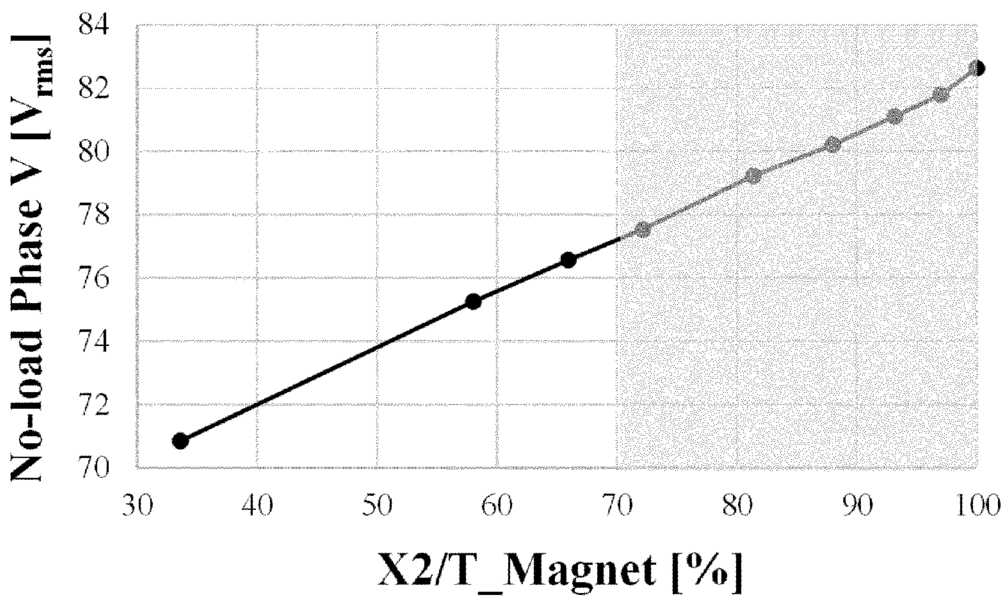

[FIG. 16f]
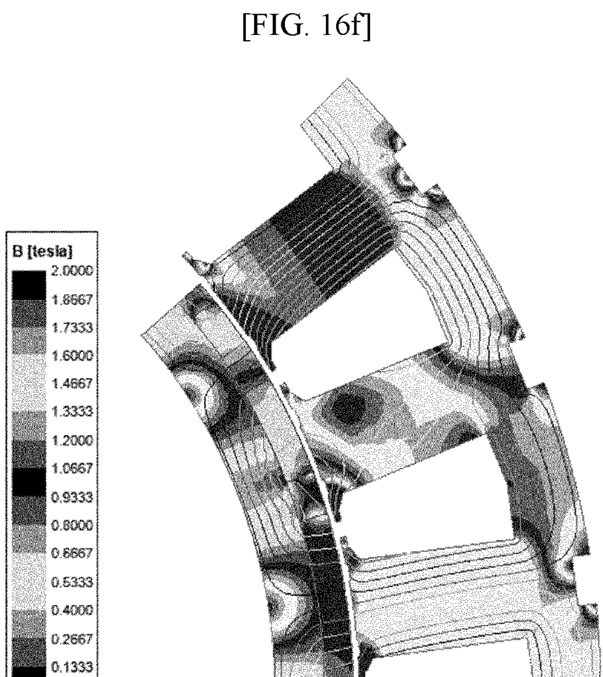
[FIG. 16g]
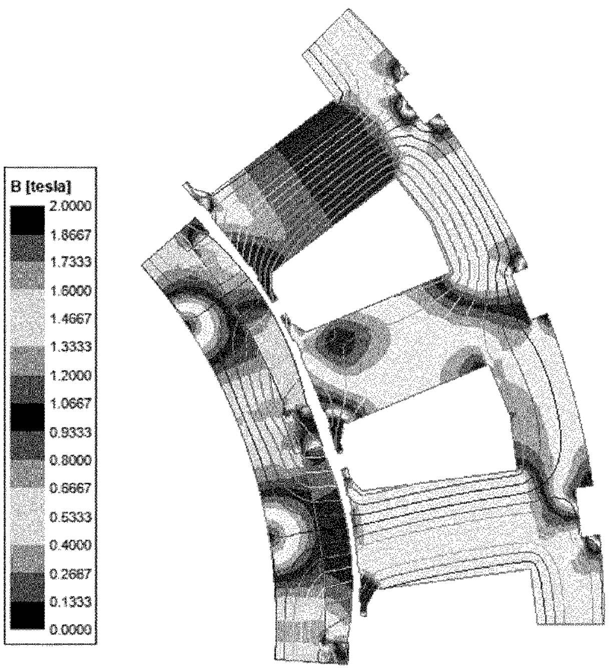

BACK-YOKELESS MAGNETIC-BEARING-INTEGRATED MOTOR

CROSS-REFERENCE TO RELATED APPLICATIONS

This application is the United States National Phase of International Application PCT/KR2021/018886, filed 13 Dec. 2021; which in turn, claims benefit of KR application 10-2021-0033804, filed 16 Mar. 2021, the entire contents of which are herein incorporated by reference.

TECHNICAL FIELD

The following disclosure relates to a back yokeless magnetic bearing-integrated motor, and in particular, to a back yokeless magnetic bearing-integrated motor in which a back yoke is eliminated in a permanent magnet motor and a magnetic bearing is installed inside a rotor, thereby integrating the magnetic bearing with a motor.

BACKGROUND ART

A motor refers to an electric machine that converts electrical energy into rotational energy, which is mechanical energy, to perform mechanical work. Technical requirements for high power, high efficiency, miniaturization, light weight, ultra-high speed, low noise, low vibration, and high reliability of such motors have been advanced and actively researched.

The motor largely includes a stator with a winding wound therearound, a rotor that rotates as a rotating magnetic field is generated by the winding of the stator, and a shaft coupled to the rotor to which a load, such as a fan, is applied. Motors may be classified as various types, and among them, a permanent magnet motor refers to a motor that forms torque by generating a magnetic field using a permanent magnet buried in or attached to a surface of a rotor of a motor.

FIG. 1 is a view showing a permanent magnet motor and a bearing together of a related art. The motor 10 includes a stator 11 with a winding wound therearound, a rotor 15 that rotates as a rotating magnetic field is generated by the winding of the stator, and a shaft 14 coupled to the rotor 15 to which a load, such as a fan, is applied, and here, the rotor 15 may include permanent magnets 12 arranged in a ring shape and a back yoke 13 in which a magnetic flux passage of the permanent magnet 12 is formed. In the permanent magnet motor 10, the permanent magnet 12 is placed in the rotating magnetic field generated by the winding of the stator and rotated together with a rotating shaft by magnetic attraction and repelling forces acting thereon. The permanent magnet motor is a key technology that may meet the ever-evolving technological demand, and research on bearings has been actively conducted to secure structural stability during high-speed rotation along with electromagnetic design technology.

In this regard, as shown in FIG. 1, a bearing 20 is coupled to the rotating shaft to support a load of the permanent magnet motor 10 and control rotation of the permanent magnet motor 10. As a bearing of the related art, a rolling bearing 20 as shown in FIG. 1(*a*) is mainly used. The rolling bearing 20 has the advantage of enduring a relatively large load in enduring the load and friction by a rigid ball 21 therein and being inexpensive; however, since the rolling bearing 20 is a contact type bearing, the rolling bearing 20 requires a lubrication system and is disadvantageous in large noise, power loss, vibration, and lifespan.

Meanwhile, FIG. 1(*b*) shows a magnetic bearing 30. The magnetic bearing 30 refers to a bearing that reduces frictional contact between the stator 11 and the rotor 15 by using magnetic levitation and controls rotation of the rotor 15. Compared with the rolling bearing 20, the magnetic bearing 30 is controlled more precisely, has less friction loss and less noise, may rotate at a high speed, and has high durability as a non-contact type; however, since rotation of the rotor 15 is controlled on both outer sides of the motor, the magnetic bearing 30 has a mechanical limit according to the increase in size.

Furthermore, the permanent magnet motor 10 according to the related art has a limit in reducing the size of the entire motor system by forming a structure in which a magnetic bearing is inserted into the rotor in the present invention by a back yoke 13 inside the permanent magnet 12.

Meanwhile, when the Halbach array is applied to the permanent magnet of the permanent magnet motor of the related art, the magnitude of the magnetic flux path inside the ring shape of the permanent magnet, that is, on the center side, decreases, but conversely, the magnitude of the magnetic flux path outside the ring shape increases. Accordingly, cogging torque, which is a torsional force, to prevent the rotor from rotating in a specific direction, may increase, and total harmonic distortion (THD) of phase line voltage may increase, generating many harmonic components that adversely affect motor performance, which causes a resistance factor during rotation.

RELATED ART DOCUMENT

Korea Patent Registration No. 10-0224533 (1999.07.14.)

DISCLOSURE

Technical Problem

An embodiment of the present invention is directed to providing a back yokeless magnetic bearing-integrated motor in which a back yoke is eliminated in a permanent magnet motor and a magnetic bearing is installed inside a rotor, thereby integrating the magnetic bearing with a motor.

Technical Solution

In one general aspect, a back yokeless magnetic bearing-integrated motor includes: a stator module including a cylindrical stator core around which a stator winding is wound; a rotor module provided inside the stator module and including a permanent magnet module including a hollow shaft having an internal space and a plurality of permanent magnets provided on an outer surface of the hollow shaft; and a magnetic bearing module provided inside the hollow shaft and levitating the hollow shaft in a radial direction from a center, wherein the plurality of permanent magnets are arranged in a Halbach array.

The magnetic bearing module may include at least one magnetic bearing having the same axis as the stator module and radially levitating the rotor module from the axis.

The magnetic bearing may include: a central axis having the same axis as the stator module; a plurality of bearing teeth coupled to the central axis, having a columnar shape formed in the radial direction, and spaced apart from each other in a circumferential direction; a bearing pole shoe extending in the circumferential direction from both ends of the plurality of bearing teeth; and a bearing winding wound on each of the plurality of bearing teeth.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, and an inner circumferential surface of each of the first permanent magnet and the second permanent magnet may be disposed on the same circumference which is a surface of the hollow shaft.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, at least a portion of the inner circumferential surface of the second permanent magnet may be inserted into the hollow shaft in a central direction, and an outer circumferential surface of the second permanent magnet may form a step difference with an outer circumferential surface of the first permanent magnet.

The step difference between the outer circumferential surfaces of the first permanent magnet and the second permanent magnet may be 36% or less of a thickness of the first permanent magnet.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, and the first permanent magnet may have a thickness gradually decreasing from a center to an edge.

A thickness of an edge of a cross-section of the first permanent magnet may be 65% or more and less than 100% of a thickness of a center of the first permanent magnet.

The hollow shaft may include: a first layer provided on the magnetic bearing module side and a second layer provided above the first layer and on the permanent magnetic module side, and a relative magnetic permeability of a material forming the second layer is less than a relative magnetic permeability of a material forming the first layer.

The relative magnetic permeability of the material forming the second layer may be 20 or less.

In another general aspect, a back yokeless magnetic bearing-integrated outer rotor-type motor includes: a stator module including a cylindrical stator core around which a stator winding is wound; a rotor module surrounding the stator module and including a permanent magnet module including a plurality of permanent magnets and a hollow shaft in which the permanent magnet module is fixed to an inner surface thereof; and a magnetic bearing module surrounding the hollow shaft and levitating the rotor module in a central direction, wherein the plurality of permanent magnets are arranged in a Halbach array.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, and an outer circumference of each of the first permanent magnet and the second permanent magnet may be disposed on the same circumference as a surface of the hollow shaft.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, an outer circumferential surface of the second permanent magnet is inserted into the hollow shaft, and an inner circumferential surface not inserted into the hollow shaft may form a step difference with an inner circumferential surface of the first permanent magnet.

In the permanent magnet module, a plurality of first permanent magnets having a line of magnetic force in an inward or outward radial direction and a plurality of second permanent magnets having a line of magnetic force in a circumferential direction but in a clockwise or counterclockwise direction may form a ring-shaped Halbach array, and the first permanent magnet may have a thickness gradually decreasing from a center to an edge.

The hollow shaft may include: a first layer provided on the magnetic bearing module side and a second layer provided below the first layer and on the permanent magnetic module side, and a relative magnetic permeability of a material forming the second layer may be less than a relative magnetic permeability of a material forming the first layer.

Other features and aspects will be apparent from the following detailed description, the drawings, and the claims.

Advantageous Effects

According to the present invention, the magnetic field by the permanent magnet is not applied to the inside of the ring shape, that is, toward the center, so that the back yoke, which was a magnetic flux passage of the related art, may be eliminated, and thus, the magnetic bearing module may be included inside the rotor module, thereby significantly reducing the size of the magnetic bearing-integrated motor.

In addition, since the magnetic bearing may control the rotor module inside the hollow shaft, the magnetic bearing-integrated permanent magnet motor may be implemented.

In addition, when the second permanent magnet having a line of magnetic force in a clockwise or counterclockwise direction is put into the hollow shaft, the magnetic field in which the permanent magnet acts on the air gap side may be reduced, thereby reducing cogging torque and THD of phase/line voltage, while maintaining the magnetic flux density in the permanent magnetic module and the hollow shaft of the existing first embodiment.

In addition, the interaction among the magnetic flux generated by the stator winding of the stator module, the magnetic flux generated by the permanent magnet module, and the magnetic flux generated by the magnetic bearing may be prevented by the second layer formed of a material having a relative magnetic permeability of 20 or less, that is, close to non-magnetic material.

DESCRIPTION OF DRAWINGS

FIG. 1 is a perspective view of a permanent magnet motor and a bearing of the related art.

FIG. 2 is a perspective view of a back yokeless magnetic bearing-integrated motor of the present invention.

FIG. 3 is a plan view of a back yokeless magnetic bearing-integrated motor of the present invention.

FIG. 4 is a partial plan view of a back yokeless magnetic bearing-integrated motor of the present invention.

FIG. 5 is an exploded perspective view of a back yokeless magnetic bearing-integrated motor of the present invention.

FIGS. 6 to 11 are partially enlarged views of a back yokeless magnetic bearing-integrated motor according to first to sixth embodiments of the present invention.

FIG. 12 is a perspective view of a back yokeless magnetic bearing-integrated outer rotor-type motor of the present invention.

FIG. 13 is a plan view of a back yokeless magnetic bearing-integrated outer rotor-type motor of the present invention.

FIG. 14 is an exploded perspective view of a back yokeless magnetic bearing-integrated outer rotor-type motor of the present invention.

FIGS. 15 and 16 are finite element analysis simulation results of a back yokeless magnetic bearing-integrated motor of the present invention.

BEST MODE FOR INVENTION

Hereinafter, the present invention will be described with reference to the accompanying drawings.

Figure 4:
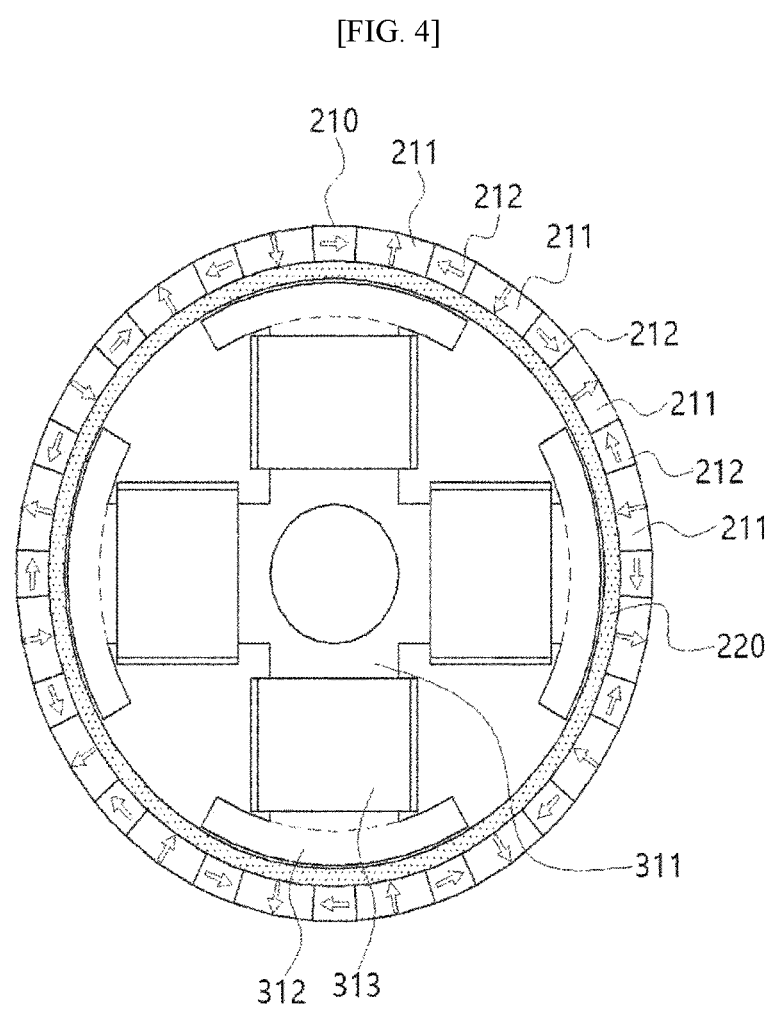

FIG. 2 is a perspective view of a back yokeless magnetic bearing-integrated motor of the present invention, FIG. 3 is a plan view of FIG. 2, FIG. 4 is a partial plan view of FIG. 2, and FIG. 5 is an exploded perspective view of FIG. 2. A back yokeless magnetic bearing-integrated motor 100 according to an embodiment of the present invention may be an inner rotor-type motor using a permanent magnet.

As shown, a motor 100 of the present invention includes a stator module 100 including a cylindrical stator core 120 around which a stator winding 110 is wound; a rotor module 200 including a hollow shaft 220 provided inside the stator module 100 and having an internal space and a permanent magnet module 210 including a plurality of permanent magnets provided on an outer surface of the hollow shaft 220, and a magnetic bearing module 300 provided inside the hollow shaft 220 and levitating the hollow shaft 200 in a radial direction from the center. At this time, the permanent magnets of the permanent magnet module 210 may be arranged in a Halbach array.

Here, the relative positions of the magnetic bearing module 300 and the stator module 100 may be mechanically fixed. Also, the magnetic bearing module 300 and the stator module 100 may have the same axis. According to the present invention, a rotating magnetic field is generated from the permanent magnet module 210 by a magnetic field generated by the stator winding 110 wound around the stator core 120, so that the permanent magnet module 210 rotates. As the permanent magnet module 210 rotates, the hollow shaft 220 coupled to the permanent magnet module 210 also rotates, and a load, such as a fan, coupled to one end of the hollow shaft 220 may rotate and generate mechanical energy.

Meanwhile, as described above, the permanent magnet motor of the related art is provided with a back yoke in which a magnetic flux passage of the permanent magnet is formed, and due to the configuration of the back yoke, there are limitations in reducing the size of the entire motor system by forming the structure in which the magnetic bearing is inserted into a rotor proposed in the present invention.

However, according to the present invention, a plurality of permanent magnets included in the permanent magnet module 210 may be arranged in a Halbach array, and in the Halbach array, a magnetic field formed outwardly may be very large, compared to a magnetic field formed inside the ring-shaped permanent magnet arrangement compared to arrangement of the magnets in the same direction. With this configuration, the magnetic field by the permanent magnet is not applied to the inside of the ring shape, that is, toward the center, so that a back yoke, which was a magnetic flux path of the related art, may be eliminated, and by eliminating the back yoke, the magnetic bearing module 300 may be included inside the rotor module 200, thereby significantly reducing the size of the magnetic bearing-integrated motor.

Referring to FIGS. 3 to 5, the magnetic bearing module 300 has at least one magnetic bearing 310 having the same axis as that of the stator module 100 and levitating the rotor module 200 in a radial direction from the central axis 314.

More specifically, the magnetic bearing 310 may include the central axis 314 having the same axis as that of the stator module 100, a plurality of bearing teeth 311 coupled to the central axis 314, having a columnar shape formed in a radial direction, and spaced apart from each other in a circumferential direction, bearing pole shoes 312 extending in a circumferential direction from both sides of the bearing teeth 311, and bearing winding 313 wound around each of the plurality of bearing teeth 311. With this configuration, the magnetic bearing 310 may control the rotor module 200 inside the hollow shaft 220, thereby implementing the magnetic bearing-integrated permanent magnet motor 100.

As shown in FIG. 5, two magnetic bearings 310 may be provided and may be spaced apart from each other in an axial direction. Each of the magnetic bearings 310 may stably support the weight of a load, such as a fan coupled to one end of the hollow shaft 220 by pulling the central axis 314 in different directions.

The magnetic bearing module 300 may include a distance measurement unit including a plurality of gap sensors measuring respective distances between the plurality of magnetic bearings 310 and the hollow shaft 220, a current measurement unit measuring current applied to the bearing winding 313 of each of the plurality of magnetic bearings 310, and a controller controlling current flowing in each of the magnetic bearings 310 based on the distance information measured by the distance measurement unit and the current information measured by the current measurement unit.

Since a load, such as a fan, is coupled to one end of the hollow shaft 220, the axis of the hollow shaft 220 may deviate from the center due to the weight of the load. Therefore, based on the distance information measured by the distance measurement unit and the current information measured by the current measurement unit, when the hollow shaft 220 deviates from the center to one side, the controller may maintain the axis of the hollow shaft 220 as the center by controlling the current flowing in the bearing winding 313 wound around each of the plurality of bearing teeth 311 of the magnetic bearing 310. With this configuration, the magnetic bearing 310 may control the rotor module 200 inside the motor.

FIGS. 6 to 11 are partially enlarged views of motors according to first to sixth embodiments of the present invention, respectively, and each embodiment of the present invention will be described below.

FIG. 6 shows a first embodiment of the present invention, and as shown, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, and inner circumferential surfaces of the first and second permanent magnets may be arranged on the same circumference which is a surface of the hollow shaft.

At this time, the magnitude of the magnetic flux path on the inside of the ring shape of the permanent magnet module 210, that is, on the center side, is reduced by the Halbach array, but conversely, the magnitude of the magnetic flux path on the outside of the ring shape increases. Accordingly, cogging torque, which is a torsional force to prevent the rotor module 200 from rotating in a specific direction, increases to increase total harmonic distortion (THD) of phase line voltage, which may become a resistance element during rotation. This is because as the THD increases, a large number of harmonic components that adversely affect the performance of the motor are formed. Accordingly, an arrangement of permanent magnets capable of reducing cogging torque and the THD of phase line voltage is disclosed in the present invention.

FIG. 7 shows a second embodiment of the present invention. As shown, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, and at least a portion of an internal circumferential surface of the second permanent magnet 212 may be inserted into the hollow shaft 220 in a central direction and an outer circumferential surface of the second permanent magnet 212 forms a step difference with an outer circumferential surface of the first permanent magnet 211.

Due to this configuration, as the line of magnetic force puts the second permanent magnet 212 in the clockwise or counterclockwise direction into the hollow shaft 220, the magnetic field in which the permanent magnet acts on the air gap side may be reduced, thereby reducing cogging torque and THD of phase/line voltage, while maintaining magnetic flux density in the permanent magnet module 210 and the hollow shaft 220 according to the first embodiment.

At this time, it is preferable that a step difference between the outer circumferential surfaces of the first permanent magnet and the second permanent magnet is 36% or less of the thickness of the first permanent magnet 211.

FIGS. 15A to 15E are finite element analysis simulation results, in which FIG. 15A shows specifications of a model to be analyzed, FIG. 15B is an enlarged view of the first embodiment of the present invention, FIG. 15C is an enlarged view of the second embodiment of the present invention, FIG. 15D shows finite element analysis simulation results according to magnetic flux density of the first embodiment of the present invention, and FIG. 15E shows the finite element analysis simulation results according to magnetic flux density of the second embodiment of the present invention.

Referring to FIG. 15C, a step difference between the first permanent magnet 211 and the second permanent magnet 212 corresponds to X1, and a thickness of the first permanent magnet 211 corresponds to T_Magnet. The results of finite element analysis according to the change of X1 show that the same B-Plot as the first embodiment is obtained up to a point at which the size of X1/T_Magnet is 36%. B-Plot is a graph representing a value of magnetic flux density B of a structure in the form of a contour line. Normally, the magnetic flux density of 1.8 T or more is considered to be saturated. If the value of the magnetic flux density in the hollow shaft 220 inside the permanent magnet module 210 becomes too large and is saturated, the magnetic flux generated by the permanent magnet module 210 and the stator module 100 may affect the magnetic bearing 310 inside the rotor module 200, and thus, it is very important to design so that the magnetic flux density is not saturated. Therefore, according to the present invention, when the step difference between the outer circumferential surfaces of the first permanent magnet and the second permanent magnet is 36% or more, the magnetic flux density of the hollow shaft 220 is highly likely to be saturated, the step difference is preferably 36% or less of the thickness of the first permanent magnet 211.

Due to this configuration, there is an effect of efficiently reducing the cogging torque and THD of the phase/line voltage, while maintaining the magnetic flux density in the hollow shaft 220.

FIG. 8 shows a third embodiment of the present invention. As shown, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, and the first permanent magnet 211 may have a tapered cross-section in which a thickness gradually decreases from the center to the edge. In the present invention, the tapered shape may refer to a shape in which the thickness decreases from the center to both ends in the circumferential direction.

In this manner, by applying the tapered shape to the permanent magnet, a waveform of air gap magnetic flux density close to an existing square wave or trapezoid may be generated sinusoidally. Accordingly, a waveform for a voltage may also be generated sinusoidally, so that cogging torque and THD of phase/line voltage may be reduced compared to the first and second embodiments.

At this time, it is preferable that a thickness of the edge of the cross-section of the first permanent magnet 211 is greater than or equal to 65% and less than 100% of the thickness of the central portion.

FIG. 16 shows finite element analysis simulation results, FIG. 16A shows an enlarged view of the second embodiment of the present invention, FIGS. 16B and 16C show an enlarged view of the third embodiment of the present invention, FIG. 16D a graph of cogging torque according to an edge thickness versus a center thickness of a permanent magnet, FIG. 16E shows a graph of no-load counter electromotive force according to an edge thickness versus a center thickness of a permanent magnet, FIG. 16F shows finite element analysis simulation results according to magnetic flux density of the first embodiment of the present invention, and FIG. 16G shows finite element analysis simulation results according to magnetic flux density of the third embodiment of the present invention.

Referring to FIG. 16C, the edge thickness of the cross-section of the first permanent magnet 211 corresponds to X2 and the center thickness corresponds to T_Magnet. As a result of finite element analysis according to the change of X2, it can be seen that cogging torque has the smallest value at a point at which the size of X1/T_Magnet is 72%. Therefore, it is preferable to form the edge thickness of the cross-section of the first permanent magnet 211 to 65% or more and 100% of the center thickness.

Due to this configuration, there is an effect of efficiently reducing the cogging torque and the THD of phase/line voltage, while maintaining magnetic flux density in the hollow shaft 220.

Meanwhile, the hollow shaft 220, as will be described later, includes a first layer 221 provided on the side of the magnetic bearing module 300 and a second layer 222 provided above the first layer 221 and on the side of the permanent magnet module 210, and a relative magnetic permeability of a material forming the second layer 222 may be smaller than that of a material forming the first layer 221.

FIG. 9 shows a fourth embodiment of the present invention. As shown, the first and second layers may also be applied to a structure in which the outer circumferential surfaces of the first permanent magnet and the second permanent magnet are arranged on the same circumference, which is the surface of the hollow shaft.

FIG. 10 shows a fifth embodiment of the present invention, and as shown, the first and second layers may also be applied to a structure in which the outer circumferential surface of the second permanent magnet 212 is inserted into the hollow shaft 220 and an inner circumferential surface which is not inserted forms a step difference with the inner circumferential surface of the first permanent magnet 211.

FIG. 11 shows a sixth embodiment of the present invention, and as shown, the first and second layers may also be applied to a structure having a tapered cross-section in which the thickness of the first permanent magnet 211 decreases from the center to the edge.

In the fourth to sixth embodiments of the present invention, relative magnetic permeability of the second layer 222 is preferably formed of a material having relative magnetic permeability of 20 or less. As described above, by the second layer formed of a material having relative magnetic permeability of 20 or less, an interaction among the magnetic flux generated by the stator winding 110 of the stator module 100, the magnetic flux generated by the permanent magnet module 210, and the magnetic flux generated by the magnetic bearing may be prevented.

Hereinafter, an outer rotor-type motor according to another aspect of the present invention will be described. FIG. 12 is a perspective view of a back yokeless magnetic bearing-integrated outer rotor-type motor according to an example of the present invention, FIG. 13 is a plan view of FIG. 12, and FIG. 14 is an exploded perspective view of FIG. 12. The back yokeless magnetic bearing-integrated outer rotor-type motor may be an outer rotor-type motor using a permanent magnet.

As shown, a motor 100 of the present invention includes a stator module 100 including a cylindrical stator core 120 around which a stator winding 110 is wound; a rotor module 200 surrounding the stator module 100 and including a permanent magnet module 210 including a plurality of permanent magnets and a hollow shaft 220 in which the permanent magnet module 210 is fixed to an internal surface thereof; and a magnetic bearing module 300 surrounding the hollow shaft 220 and levitating the rotor module 200 in a central direction. At this time, the permanent magnets may be arranged in a Halbach array.

As the permanent magnets are arranged in a Halbach array, a magnetic field by the permanent magnets is not applied toward the center, so that a back yoke may be eliminated, and by eliminating the back yoke, the magnetic bearing module 300 may be included in the rotor module 200, thereby reducing the size of the magnetic bearing-integrated motor. The details of the Halbach array are as described above.

Referring to FIGS. 12 to 14, the magnetic bearing module 300 may include at least one magnetic bearing 310 coaxial with the stator module 100 and levitating the rotor module radially from the central axis 314.

More specifically, the magnetic bearing 310 may have a columnar shape formed in a radial direction with the stator module 100 and may include a plurality of bearing teeth 311 arranged to be spaced apart from each other in the circumferential direction, a bearing pole shoe 312 extending from both ends of the bearing teeth 311 in the circumferential direction, and a bearing winding 313 wound around each of the plurality of bearing teeth 311. With this configuration, the rotor module 200 may be controlled from the outside where the magnetic bearing 310 surrounds the hollow shaft 220, thereby implementing a magnetic bearing-integrated permanent magnet motor.

According to the first embodiment of the outer rotor-type motor, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, and the outer circumferential surfaces of the first and second permanent magnets may be disposed on the same circumference which is the surface of the hollow shaft.

According to the second embodiment of the abducted motor, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, but the outer circumferential surface of the second permanent magnet 212 may be inserted into the hollow shaft 220, and an inner circumferential surface which is not inserted may form a step difference with the inner circumferential surface of the first permanent magnet 211.

At this time, it is preferable that the step difference between the inner circumferential surfaces of the first permanent magnet and the second permanent magnet is 36% or less of the thickness of the first permanent magnet 211.

According to the third embodiment of the outer rotor-type motor, in the permanent magnet module 210 of the rotor module 200, a plurality of first permanent magnets 211 having a line of magnetic force in an inward or outward radial direction and a plurality of second permanent magnets 212 having a line of magnetic force in a circumferential direction but in a clockwise or counterclockwise direction form a ring-shaped Halbach array, but the first permanent magnet 211 may have a tapered cross-section in which the thickness gradually decreases from the center to the edge.

At this time, the edge thickness of the cross-section of the first permanent magnet 211 may be configured to be 65% or more and less than 100% of the center thickness.

Due to the configurations of the second and third embodiments, the cogging torque and the THD of phase/line voltage may be efficiently reduced, while maintaining the magnetic flux density in the hollow shaft 220.

Meanwhile, the hollow shaft 220 may include a first layer 221 provided on the magnetic bearing module 300 side and a second layer 222 provided below the first layer 221 and provided on the permanent magnet module 210 side, and relative magnetic permeability of a material forming the second layer 222 may be less than relative magnetic permeability of a material forming the first layer 221.

In this manner, by the second layer formed of a material having a relative permeability of 20 or less, that is, close to a non-magnetic material, an interaction among the magnetic flux generated by the stator winding 110 of the stator module 100, the magnetic flux generated by the permanent magnet module 210, and the magnetic flux generated by the magnetic bearing may be prevented.

Although the embodiments of the present invention have been described with reference to the accompanying drawings, those skilled in the art may implement the present invention in other specific forms without changing its technical spirit or essential features. Therefore, it should be understood that the embodiments described above are illustrative in all respects and not restrictive.

DETAILED DESCRIPTION OF MAIN ELEMENTS

100: stator module
110: stator winding
120: stator core
200: rotor module
210: permanent magnet module
211: first permanent magnet
212: second permanent magnet
220: hollow shaft
221: first layer
222: second layer
300: magnetic bearing module
310: magnetic bearing
311: bearing tooth
312: bearing fall shoe
313: bearing winding

The invention claimed is:

1. A back yokeless magnetic bearing-integrated motor comprising:
- a stator module including a cylindrical stator core around which a stator winding is wound;
- a rotor module provided inside the stator module and including a permanent magnet module including a hollow shaft having an internal space and a plurality of permanent magnets provided on an outer surface of the hollow shaft; and
- a magnetic bearing module provided inside the hollow shaft and levitating the hollow shaft in a radial direction from a center,
- wherein the plurality of permanent magnets are arranged in a Halbach array.

2. The back yokeless magnetic bearing-integrated motor of claim 1, wherein the magnetic bearing module includes at least one magnetic bearing having the same axis as the stator module and radially levitating the rotor module from the axis.

3. The back yokeless magnetic bearing-integrated motor of claim 2, wherein the magnetic bearing includes:
- a central axis having the same axis as the stator module;
- a plurality of bearing teeth coupled to the central axis, having a columnar shape formed in the radial direction, and spaced apart from each other in a circumferential direction;
- a bearing pole shoe extending in the circumferential direction from both ends of the plurality of bearing teeth; and
- a bearing winding wound on each of the plurality of bearing teeth.

4. The back yokeless magnetic bearing-integrated motor of claim 1, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array, and
- an inner circumferential surface of each of the first permanent magnet and the second permanent magnet is disposed on the same circumference which is a surface of the hollow shaft.

5. The back yokeless magnetic bearing-integrated motor of claim 1, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array,
- at least a portion of the inner circumferential surface of the second permanent magnet is inserted into the hollow shaft in a central direction, and
- an outer circumferential surface of the second permanent magnet forms a step difference with an outer circumferential surface of the first permanent magnet.

6. The back yokeless magnetic bearing-integrated motor of claim 5, wherein the step difference between the outer circumferential surfaces of the first permanent magnet and the second permanent magnet is 36% or less of a thickness of the first permanent magnet.

7. The back yokeless magnetic bearing-integrated motor of claim 1, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array, and
- the first permanent magnet has a thickness gradually decreasing from a center to an edge.

8. The back yokeless magnetic bearing-integrated motor of claim 7, wherein a thickness of an edge of a cross-section of the first permanent magnet is 65% or more and less than 100% of a thickness of a center of the first permanent magnet.

9. The back yokeless magnetic bearing-integrated motor of claim 1, wherein the hollow shaft includes
- a first layer provided on the magnetic bearing module side and a second layer provided above the first layer and on the permanent magnetic module side, and
- a relative magnetic permeability of a material forming the second layer is less than a relative magnetic permeability of a material forming the first layer.

10. The back yokeless magnetic bearing-integrated motor of claim 9, wherein the relative magnetic permeability of the material forming the second layer is 20 or less.

11. A back yokeless magnetic bearing-integrated outer rotor-type motor, comprising:
- a stator module including a cylindrical stator core around which a stator winding is wound;
- a rotor module surrounding the stator module and including a permanent magnet module including a plurality of permanent magnets and a hollow shaft in which the permanent magnet module is fixed to an inner surface thereof; and
- a magnetic bearing module surrounding the hollow shaft and levitating the rotor module in a central direction,
- wherein the plurality of permanent magnets are arranged in a Halbach array; and wherein the hollow shaft includes a first layer provided on the magnetic bearing module side and a second layer provided below the first layer and on the permanent magnetic module side, and a relative magnetic permeability of a material forming the second layer is less than a relative magnetic permeability of a material forming the first layer.

12. The back yokeless magnetic bearing-integrated outer rotor-type motor of claim 11, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array, and an outer circumference of each of the first permanent magnet and the second permanent magnet is disposed on the same circumference as a surface of the hollow shaft.

13. The back yokeless magnetic bearing-integrated outer rotor-type motor of claim 11, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array, and an outer circumferential surface of the second permanent magnet is inserted into the hollow shaft, and an inner circumferential surface not inserted into the hollow shaft forms a step difference with an inner circumferential surface of the first permanent magnet.

14. The back yokeless magnetic bearing-integrated outer rotor-type motor of claim 11, wherein, in the permanent magnet module, a plurality of first permanent magnets having a line of magnetic force in an inward or outward radial direction and a plurality of second permanent magnets having a line of magnetic force in a circumferential direction but in a clockwise or counterclockwise direction form a ring-shaped Halbach array, and the first permanent magnet has a thickness gradually decreasing from a center to an edge.

* * * * *